United States Patent
Garib

(12) 
(10) Patent No.: US 6,728,378 B2
(45) Date of Patent: Apr. 27, 2004

(54) SECRET KEY MESSAGING

(75) Inventor: Marco Aurelio Garib, Sao Paulo (BR)

(73) Assignee: Eversystems Information Comircio Representagco, Importageo e Exportagco Ltda., Sao Paulo SP (BR)

( * ) Notice: Subject to any disclaimer, the term of this patent is extended or adjusted under 35 U.S.C. 154(b) by 43 days.

(21) Appl. No.: 09/975,848

(22) Filed: Oct. 11, 2001

(65) Prior Publication Data

US 2002/0078351 A1 Jun. 20, 2002

Related U.S. Application Data

(60) Provisional application No. 60/240,565, filed on Oct. 13, 2000.

(51) Int. Cl.[7] .......................... H04L 9/08; H04L 29/06; H04L 12/58

(52) U.S. Cl. .......................... 380/259; 705/67; 705/58; 705/76; 380/286; 380/262; 380/281; 713/150; 713/164; 713/170; 709/206; 709/217

(58) Field of Search .............................. 380/259, 262, 380/281, 286; 705/67, 58, 76; 713/150, 164, 165, 170, 171, 182, 202; 709/206, 217, 218, 219, 238

(56) References Cited

U.S. PATENT DOCUMENTS

| | | | |
|---|---|---|---|
| 5,751,814 A | 5/1998 | Kafri | 380/49 |
| 5,943,423 A * | 8/1999 | Muftic | 705/67 |
| 6,014,688 A | 1/2000 | Venkatraman et al. | 709/206 |
| 6,304,897 B1 | 10/2001 | Venkatraman et al. | 709/206 |
| 6,367,010 B1 | 4/2002 | Venkatraman et al. | 713/171 |

FOREIGN PATENT DOCUMENTS

| | | |
|---|---|---|
| WO | 0042748 | 7/2000 |
| WO | 0049786 | 8/2000 |
| WO | 0223785 | 3/2002 |

OTHER PUBLICATIONS

US 5,373,559, 12/1994, Kaufman et al. (withdrawn)
Chapter 12: Electronic Mail Security, pp. 335–397, of "Cryptography and Network Security" by William Stallings, Publ. Prentice Hall.
U.S. patent application Ser. No. 09/780,037, Wright et al., filed Feb. 9, 2002.

* cited by examiner

*Primary Examiner*—Ly V. Hua
(74) *Attorney, Agent, or Firm*—White & Case LLP

(57) ABSTRACT

The invention provides computer-enabled methods and systems for the secure transmission and platform-independent receipt and decryption of encrypted messages. According to the invention messages are encrypted by a symmetric encryption algorithm using a secret key that is, or is based on, a password known to the intended recipient. The recipient is also sent a computer program which upon input of the correct password, uses the password to generate the secret key, or alternatively, uses the password as the secret key. The program then uses the secret key to decrypt the encrypted message. The invention further provides for ensuring the integrity and authenticity of sent and received messages. The communications medium over which messages are sent according to the invention may be a communications network such as the Internet and the messages may be electronic mail messages and MIME messages. The invention also provides for the secure delivery of statement and transaction information pertaining to an account.

59 Claims, 1 Drawing Sheet

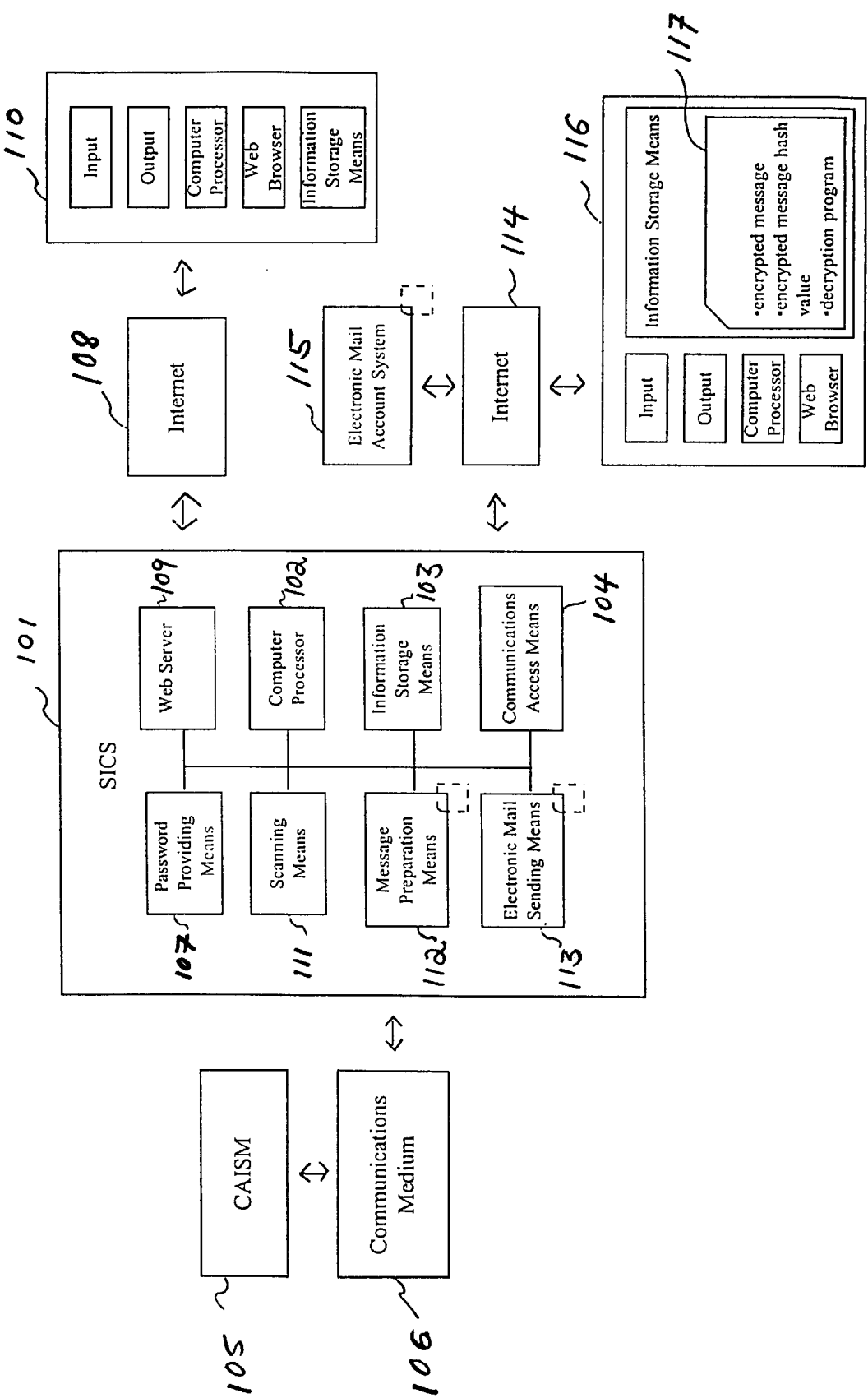

SECRET KEY MESSAGING

This application claims the benefit of U.S. provisional patent application Ser. No. 60/240,565, filed Oct. 13, 2000, which is hereby incorporated by reference in its entirety.

BACKGROUND

Secure yet facile delivery of information is an important goal in the field of electronic communications. Confidentiality and integrity are especially important for communicating certain types of information. For the individual, this may include financial information and medical information. Various schemes employing encryption have been developed to address the security issues related to electronic messages and, in particular, electronic mail messages.

U.S. Pat. No. 5,751,814 discloses a method for transmitting and receiving encrypted messages which includes the steps of encrypting the text of the message to be sent and concatenating the encrypted text together with a password to the end of a decryption application to produce a combined file. The combined file is then converted to an electronic mail format and sent to a designated recipient. To decrypt the sent message, the recipient must de-concatenate the file into its constituents and run the decryption application, using password input from the individual seeking to decrypt the message. If the password inputted by the individual matches the password concatenated with the encrypted message and decryption application, the decryption application is activated and decrypts the encrypted message.

This system is insecure and therefore disadvantageous for the following reasons. First, the combined file contains the password and hence an assault on the combined file by an unauthorized party could yield the password. Second, the decryption application of the combined file is capable of decrypting the encrypted message and only requires password-activation to do so. Since the function of the password is only to activate the decryption application, an unauthorized person could de-concatenate the combined file and seek to activate the decryption application or a derivation thereof without using the password. In view of these two disadvantages, it is clear that a more secure system for sending and receiving messages would be one which does not include the password in the sent message or in any file connected thereto and which employs the password not to simply activate decryption by the decryption program but as an essential component of the decryption process itself. Still another disadvantage of the system of U.S. Pat. No. 5,751,814 is that, since it does not employ a script or applet type decryption program which can be executed from within an Internet communications application from anywhere, the scope of the devices with which the system can be used to receive and decrypt electronic mail messages is limited by the potential requirement for having additional software applications installed on the device

SUMMARY

In view of the above, the invention provides computer-enabled methods and systems for the secure transmission and platform-independent receipt and decryption of encrypted messages, using secret-key cryptography. Further, no passwords, unencrypted or encrypted, are included in encrypted messages sent according to the invention, or in files combined with or associated with the messages. Still further, a decryption of encrypted messages cannot be obtained by operating the decryption program of the present invention without providing the correct password.

According to the invention, prepared messages are encrypted by a symmetric encryption algorithm using a secret key. In one embodiment of the invention, the secret key is a password known to both the sender and the intended recipient. In an alternative embodiment of the invention, the secret key is a hash value of a password, which password is known to the intended recipient and which hash value is generated by and known to the sender. The recipient is also sent a decryption computer program which, upon input of the correct password, either uses the password as the secret key or uses the password to generate the secret key, depending on the embodiment of the invention. The decryption program then uses the secret key with the symmetric algorithm to decrypt the encrypted message.

Since the encrypted messages and the corresponding decryption programs of the invention can be sent together to the recipient and can be accessed by the recipient using the same device, the invention provides that messages can be securely sent to and decrypted by the intended recipient, who provides the correct password, from any suitable platform capable of running the decryption program so that the decryption program receives password input and can apply the secret key based thereon with the symmetric algorithm to decrypt the encrypted message. In this manner, the confidentiality of sent and received messages is maintained.

The invention further provides for ensuring the integrity of sent and received messages through the comparison of a hash value generated for a given message (before encryption) by the sending system with that generated by the recipient for a putative decryption of the encrypted message.

The communications medium over which messages are sent according to the invention may be, but is not limited to, a communications network such as the Internet and embodiments of the invention where the messages are electronic mail messages, the messages may be formatted in hypertext markup language (HTML) so that they can be accessed from anywhere via the world wide web using a web browser program or similar Internet application supported by a suitable device. In this case, the decryption program may be sent with the electronic mail in the form of an applet or script that can be executed by the web browser.

The invention also provides for the suitably secure delivery of periodic and non-periodic statement and transaction information from commercial entities to consumers and/or clients of any sort. In this case, the commercial entity may be a consumer financial service provider such as, but not limited to, a banking institution or a brokerage firm and the consumers may be individual customers thereof. For example, in one such embodiment, the method of the invention involves periodically preparing messages with a specific bank customer's current account information including the account identification number, the account balance and account activity. The prepared bank statement is then encrypted and sent to the customer to be received and decrypted by the customer.

BRIEF DESCRIPTION OF THE DRAWINGS

FIG. 1 is a schematic diagram illustrating a system according to the present invention for the secure communication of account statements via electronic mail.

The preceding description and the accompanying figure are meant to illustrate principles of the invention and its implementation and are not meant to be limiting thereof. Accordingly, many other embodiments within the scope of the invention should be apparent to those skilled in the art.

DETAILED DESCRIPTION OF THE INVENTION

The following definitions are helpful in understanding the description of the invention or any examples but are not to be construed as limiting. The meaning of terms not listed below are explained elsewhere or should be well known to those skilled in the art.

Applet refers to a computer program sent by a server computer system to a client computer system as an attachment in an HTML or other world wide web format so that the applet is executed by a web browser program supported by the client system. Applets can be written in the Java™ programming language.

Script refers to a program written in a scripting language which can interact with other programs or with a set of functions provided by an interpreter. A script can be embedded in server-parsed HTML, or any other kind of markup language, so that a client system receiving the script can execute the script. An example of a scripting language is JavaScript™.

Applets and scripts can both be executed by a suitable web browser program supported by a suitable device such as a personal computer. Various types of Reader and Web Reader programs which can be used by a client system to access electronic mail can also be capable of executing applets and scripts. Advantageously, applets and scripts can be substantially portable between different operating systems.

Simple Mail Transfer Protocol (SMTP) is a well established server-to-server protocol for the transfer of electronic mail messages. Other protocols are used by client devices to access the messages from electronic mail account servers. Post Office Protocol Version 3 (POP3) is one such protocol which is well established. POP3 is useful for computers or other devices without a permanent network connection to an electronic mail server and which therefore require a "post office" (the POP3 server) to hold electronic mail messages until they can be retrieved by the client system. SMTP and POP3 can be used in conjunction to implement the sending and receiving of electronic mail via the Internet.

Three concepts generally relate to the security of messages sent from a sender to an intended recipient: confidentiality, integrity, and authenticity. Confidentiality means that the information content of a message is not revealed to any unauthorized party. Encryption can be used to ensure varying degrees of confidentiality. Integrity of a message is defined as the state of not having been altered in information content between the sending and receipt of the message. Hashing algorithms and hash values (see below) can be used to ensure the integrity of a message. Authenticity means that the recipient can be reasonably assured of the identity of the sender (i.e., that the received message was actually sent by the party who claims to be the sender). Digital signature methods, as known in the art, can be used to ensure the authenticity of a message.

A hashing algorithm is an algorithm that, when applied to the information content of a variable length message, produces a fixed-length hash value ("hash"). For some hashing algorithms ("one-way hash algorithms"), it is computationally very difficult or impossible to derive information about the message from the hash value. Further, for some hashing algorithms, it is computationally impossible to create two non-identical messages having the same hash value. Hence, hash values can be used to confirm the integrity of an encrypted message upon its decryption. Generally, prior to encryption a hashing algorithm is applied to the message by the sender to generate a message hash value which is then appended to the message and encrypted along with it. The hashing algorithm used is one available to, or which will be made available to, the intended recipient. The intended recipient is then sent the encrypted message with the encrypted message hash value. Upon decryption of the message and message hash value, the recipient applies the hashing algorithm to the decrypted message to obtain a decrypted-message hash value and compares this with the decrypted message hash value. If the two hash values are not identical, either the password is incorrect, or the message has been altered in transit, or both.

Hash values can also be used to implement password protection in a system which grants access to users by password. In this case, rather than storing the actual password of a users, a hash value is generated from the password and stored. The system's access interface receives password input from users and generates a hash value therefrom for comparison to stored authorized hash values. In this manner, a user's actual password is found nowhere on the system so that not even the system administrator or other personnel with access to the system can obtain the user's password. Well established one-way hash algorithms known in the art include Message Digest 5 (MD5) and Secure Hash Algorithm-1 (SHA-1). It should be understood that any sort of algorithm or process which uses message data to generate a fixed length or variable length value can be used in place of a standard hashing algorithm so long as it remains computationally very difficult or impossible to create more than one non-identical message with the same value.

Secret-key cryptography or symmetric-key encryption refers to any encryption method in which a single key (the secret-key) known to both the sender and recipient, is used to both encrypt and decrypt information. Symmetric encryption algorithms, as referred to herein, are algorithms utilizing a single secret key to encrypt and decrypt particular information. In one embodiment of the present invention the secret key is a password known to both the sender and recipient of a message. In another embodiment of the invention, the secret key is a hash value of a recipient's password, which hash value is known to the sender and which hash value can be generated by the recipient by applying the hashing algorithm to his password. Well established symmetric encryption algorithms known in the art include the International Data Encryption Algorithm (IDEA) and RC4.

Public key cryptography, also known as asymmetric key cryptography, provides a highly secure method of encryption and decryption using two keys, a public key and a private key. Encryption is performed using one of the keys with a public key algorithm. Data encrypted with the public key algorithm can only be decrypted with the private key. Similarly, data encrypted with the private key can only be decrypted with public key. Since public key algorithms are highly complex mathematical equations utilizing very large numbers, it is unfeasible for individual users of standard computer devices to routinely use public key cryptography for encryption and decryption of electronic communications due to the computational slowness of these devices. Hence, for consumer computer device users, public key cryptography is generally reserved for critically important exchanges of information such as for ensuring confidentiality in the exchange of a secret key (for use with a symmetric algorithm) and for ensuring the authenticity of a message by including a digital signature.

A digital signature is a message hash value encrypted using public key cryptography and sent with the message to the intended recipient. The message itself may be either unencrypted (clear text format) or encrypted as the purpose of the digital signature is to ensure the integrity and authenticity of the sent message but not its confidentiality. Since only a message hash value is encrypted using public key cryptography and not the whole message, the routine use of digital signatures is computationally feasible for standard consumer computer devices. Advantageously, the present invention uses computationally fast symmetric algorithms for the encryption of message data and also provides for the use of public key cryptography in ensuring the integrity and authenticity of that data. A further disadvantage of public key encryption in comparison to symmetric key encryption is that the key used by an individual in public key encryption is so large that it is unfeasible for the individual to produce the key if it is not saved in some sort of computer readable memory. If the key needed by the individual is the public key it could, for example, be made readily accessible to anyone on the Internet. However, if the key needed is the private key, generally it would have to be stored on the individual's designated devices or carried in some form of computer readable memory that can be read by the device. Hence, access and decryption of public key encrypted information is not as platform-independent as symmetric key encryption. The following public key algorithms are commonly used as described and may be employed accordingly herein. The Rivest-Shamir-Adleman (RSA) public key algorithms is commonly used for both key exchange and for generating digital signatures. The digital signature algorithm (DSA) is used for digital signatures only. The Diffie-Hellman public key algorithm is used for key exchange only.

According to the invention, messages are encrypted and decrypted by a symmetric encryption algorithm using a secret key. The symmetric encryption algorithm used may be, but is not limited to, IDEA or RC4. In one embodiment of the invention, the secret key is a password known to both the sender and the intended recipient. In an alternative embodiment of the invention, the secret key is a hash value of a password, which password is known to the intended recipient and which hash value is known to the sender. The recipient is also sent a computer program (the decryption program) which, upon input of a password, either uses the password as the secret key or uses the password to generate the secret key, depending on the embodiment of the invention. The decryption program then uses the putative secret key with the symmetric encryption algorithm to attempt to decrypt the encrypted message. If the password inputted by the recipient, and therefore the secret key, is correct the decrypted message is identical to the message that was sent. If the password input, and therefore the secret key, are incorrect, the putative decryption produced will be incorrect.

The password, whether it is the secret key or is used to generate the secret key, must be assigned in advance of sending a message to the recipient so that it can be used as the secret key or to generate the secret key. If the sender selects the password it must be communicated to the recipient in a secure manner. If the recipient selects the password it must be communicated to the sender in a secure manner. The process by which both the sender and the prospective recipient both gain knowledge of the secret key is known as key-exchange. Key-exchange embodies its own security considerations. Public-key encryption methods, as known in the art, are commonly used to ensure the security of key exchange over electronic communications media and may be used for key exchange for the present invention. In any case, according to the invention, the prospective recipient is said to have been provided with a password regardless of how the password is selected or who initiates the key exchange.

The risk that a prospective recipient's password can be obtained in an unauthorized manner from the sender system can be decreased by establishing a secret key which is a hash value generated from the recipient's password and then storing only this hash value and not the password itself on those parts of the sender system which are potentially accessible by unauthorized means or, alternatively, not storing the original password at all. If the password is securely stored, further security can be provided by periodically accessing the password to generate new secret keys which are also hash values of the designated recipient's password. Alternatively, multiple hash values can be generated initially and stored for future use as required. When a new hash value is instituted as the new secret key, the decryption computer program that is sent to a recipient is updated so that the input of the correct password generates the new hash value which is the new secret key. The hashing algorithm used to produce hash values of passwords according to the invention may be, but is not limited to, MD5 or SHA-1.

Since a message and a corresponding decryption program of the invention can be sent together to the recipient, and can be accessed by the recipient using the same device, the invention provides that messages can be securely sent to and decrypted by the intended recipient by providing the correct password from any suitable platform capable of running the decryption program so that it receives password input and can apply the secret key generated therefrom with the symmetric algorithm to decrypt the encrypted message. In this manner, the confidentiality of sent and received messages is maintained irrespective of the location or ownership of the device used by the recipient.

The invention further provides for ensuring the integrity of sent and received messages. In this case, a hashing algorithm is applied to the unencrypted prepared message to generate a message hash value. The message hash value is appended to the unencrypted message and is thereafter encrypted along with the message. The intended recipient is provided with a message hashing computer program for calculating the hash value of the decrypted message. The message hashing computer program may be part of the decryption program. In this case, when the decryption program attempts to decode the encrypted message using the putative secret key generated from the password input, it generates a hashing of the putatively decrypted message, and a putative decryption of the message hash value appended to the original message. The decryption program then compares the putative decrypted message hash value from the putative decrypted message with the message hash value calculated from the putative decrypted message. If the message hash values compared are identical, there is reasonable assurance that the integrity of the message has been maintained throughout its delivery process (i.e., it has not been altered) and that the password is correct. If the message hash values compared are not identical, then the integrity of message has been compromised, or the password is incorrect, or both.

In embodiments of the invention in which hash values of both the recipient's password and the prepared message are employed, the hashing algorithm used to generate the message and password hash values may be the same or different.

The communications medium over which messages are sent according to the invention may be a communications network such as the Internet and the messages may be electronic mail messages. It should be understood that electronic mail messages can contain not only data for textual presentation but also data for a myriad of presentation formats including, but not limited to, audio, graphics, and video. Electronic mail messages may include files of any sort including computer programs. The multi-purpose Internet mail extension (MIME) standard is commonly used for sending multi-part and multi-format electronic mail messages and world-wide web hypertext documents via the Internet. The MIME standard can be used to "bundle" the encrypted message, the decryption program, and depending on the embodiment of the invention, the encrypted message hash value into one electronic mail message. A single electronic mail message embodying various parts according to the MIME standard is called a MIME message. When the message encrypted by a sender is part of a markup language document, such as an HTML document, the decryption program can be embedded in the same document or it can be a wholly separate part of the same MIME message. However, it should also be understood that, according to the invention, any one or all of the components described can be sent as separate communications to a recipient. Further, any one component can be sent in its entirety in a single communication or in parts as separate communications.

In embodiments of the invention in which the messages are electronic mail messages, the messages may be formatted in hypertext markup language (HTML) so that they can be accessed from anywhere via the world wide web using a web browser program or electronic mail reader program supported by a computer processor of a suitable device. It should be understood that any other sort of markup language or format, that is known to the sender and for which the recipient's device is enabled, can also be used. For example, for wireless Internet communications using the wireless application protocol (WAP), such as wireless electronic mail messaging via a cell phone, the wireless markup language (WML) can be used. In these cases, the decryption program may be sent with the electronic mail in the form of an applet or script that can be executed by the web browser or reader program. Hence, the decryption program, including any necessary hashing algorithm functions can, for example, be written in the Java™ or JavaScript™ programming language and embedded within the HTML format of the electronic mail message so that the program is executed by the client device used by the recipient or by a web browser or other suitably-enabled computer program operating thereon. In this example, when a recipient accesses the encrypted electronic mail message formatted in HTML using a web browser, the decryption program is read and executed by the web browser. Suitable web browsers include, but are not limited to, Netscape Navigator 4.0™ and superior versions and Microsoft Internet Explore 4.0™ and superior versions.

From the preceding, it should be apparent that, according to the invention, even when the message is sent to an electronic mail account of an intended recipient for which an unauthorized person has gained access, the unauthorized person will not be able to read the message unless he or she is in possession of the password for the message. This provides an extra degree of security for messages sent to recipients' electronic mail accounts in addition to those which may be provided by the electronic mail account system itself.

It should also be understood that the decryption program can be sent to the recipient apart from the encrypted message. For example, the decryption program and encrypted message may be sent at different times to the same recipient. In another example, the decryption program and encrypted message can be sent by different routes or different communication media to the recipient. Moreover, parts of the decryption program and/or encrypted message may be sent separately for recombination by the recipient. In these ways, the transit of the encrypted message and the decryption can be uncoupled. This uncoupling can increase security by making it more difficult for an unauthorized party to intercept the decryption program and the encrypted message. Many variations should be apparent to one skilled in the art.

The invention provides for the suitably secure delivery of periodic and non-periodic information reports of any sort. Examples of such information reports include statement and transaction reports from commercial entities to consumers and/or other types of clients. In this case, the commercial entity may be a consumer financial service provider such as, but not limited to, a banking institution or a brokerage firm and the consumers may be individual customers or other account holders. For example, in one such embodiment, the method of the invention involves periodically preparing messages with a specific bank customer's current account information including the account identification number, the account balance and account activity for a recent period.

EXAMPLE 1

Example 1 illustrates the steps in a method according to the present invention in which a password known to both the sender and the intended recipient of a message is used as the secret key for encryption and decryption with a symmetric key algorithm.

In the Sender System:
  Step (1) provide password to prospective recipient;
  Step (2) prepare message to be sent to recipient;
  Step (3) encrypt the message with a symmetric encryption algorithm wherein the secret key is the password;
  Step (4) send the recipient the encrypted message and the decryption program;
In the Recipient System:
  Step (5) receive encrypted message and the decryption program;
  Step (6) execute the decryption program;
Decryption Program Operations:
  Step (7) receive password input from the recipient; and
  Step (8) apply symmetric encryption algorithm using the password input as the symmetric key to produce putative decryption of encrypted message. If the password input is correct, the original message is reproduced for the recipient. If the password input is incorrect, the information content of the original message is not reproduced.

EXAMPLE 2

Example 2 illustrates the steps in a method according to the present invention in which a password known to both the sender and the intended recipient of a message is used as the secret key for encryption and decryption with a symmetric key algorithm and in which a message hash value is used to ensure integrity.

In the Sender System:
  Step (1) provide password to prospective recipient;
  Step (2) prepare message to be sent to the recipient;
  Step (3) apply hashing algorithm message to generate first message hash value;
  Step (4) encrypt the message and the message hash value with a symmetric encryption algorithm wherein the secret key is the password;
  Step (5) send the recipient the encrypted message, the encrypted message hash value and the decryption program;

In the Recipient System:
  Step (6) receive encrypted message, encrypted message hash value and the decryption program;
  Step (7) execute the decryption program;
Decryption Program Operations:
  Step (8) receive password input from the recipient;
  Step (9) apply symmetric encryption algorithm using the password input as the symmetric key to produce putative decryptions of encrypted message and encrypted hash value;
  Step (10) apply hashing algorithm to putative decryption of encrypted message to generate second message hash value; and
  Step (11) compare first and second message hash values. If the first and second message hash values are not identical, then the password is incorrect and/or the integrity of the message has been compromised. If the first and second message hash values are identical, then the password is correct, the integrity of the message has not been compromised and the original message is reproduced for the recipient.

EXAMPLE 3

Example 3 illustrates the steps in a method according to the present invention in which a hash value of a password, which password is known to the intended recipient of a message, is used as the secret key for encryption and decryption with a symmetric key algorithm.
In the Sender System:
  Step (1) provide password to prospective recipient;
  Step (2) apply hashing algorithm to password to generate password hash value;
  Step (3) prepare message to be sent to the recipient;
  Step (4) encrypt the message with a symmetric encryption algorithm wherein the secret key is the password hash value;
  Step (5) send the recipient the encrypted message and the decryption program;
In the Recipient System:
  Step (6) receive encrypted message and the decryption program;
  Step (7) execute the decryption program;
Decryption Program Operations:
  Step (8) receive password input from the recipient;
  Step (9) apply the hashing algorithm to password input to generate a password input hash value; and
  Step (10) apply symmetric encryption algorithm using the password input hash value as the symmetric key to produce putative decryption of encrypted message. If the password input is correct, then the original message is reproduced for the recipient. If the password input is incorrect, the information content of original message is not reproduced.

EXAMPLE 4

Example 4 illustrates the steps in a method according to the present invention in which a hash value of a password, which password is known to the intended recipient of a message, is used as the secret key for encryption and decryption with a symmetric key algorithm and in which a message hash value is used to ensure integrity.

In the Sender System:
  Step (1) provide password to prospective recipient;
  Step (2) apply a password hashing algorithm to password to generate a password hash value;
  Step (3) prepare message to be sent to the recipient;
  Step (4) apply a message hashing algorithm message to generate a first message hash value;
  Step (5) encrypt the message and the message hash value with a symmetric encryption algorithm wherein the secret key is the password hash value;
  Step (6) send the recipient the encrypted message, the encrypted message hash value and the decryption program;
In the Recipient System:
  Step (7) receive encrypted message, encrypted message hash value and the decryption program;
  Step (8) execute the decryption program;
Decryption Program Operations:
  Step (9) receive password input from the recipient;
  Step (10) apply the password hashing algorithm to the password input to generate a password input hash value;
  Step (11) apply symmetric encryption algorithm using the password input hash value as the symmetric key to produce putative decryptions of encrypted message and encrypted hash value;
  Step (12) apply message hashing algorithm to putative decryption of encrypted message to generate second message hash value; and
  Step (13) compare first and second message hash values. If the first and second message hash values are not identical, then the password is incorrect and/or the integrity of the message has been compromised. If the first and second message hash values are identical, then the password is correct, the integrity of the message has not been compromised, and the original message is reproduced for the recipient.

EXAMPLE 5

The following example is meant to illustrate various features of the invention but in no way is meant to limit the scope of the invention to the specific embodiment and use described. A system for the secure transmission and receipt of periodically issued bank account statements via electronic mail is described herein with reference to FIG. 1 and is provided as follows. A statement issuing computer system (SICS) 101 comprising at least one computer processor 102, information storage means 103, and communications access means 104 for sending and receiving information via the Internet and other communications media or networks is provided.

At least one computer program instruction set is used to instruct the system components according to the invention to perform their described functions and to collectively perform the method of the invention. The instruction sets used may be present as software in memory or implemented as hardware, for example by being burned onto a computer chip. The instruction sets used may be written in C++, VisualBasic™, assembler, Borland Delphi™, Java™, JavaScript™, or in any other computer programming language or combination thereof, as required. An instruction set may also be a macro or template in a spreadsheet, or a custom-designed and implemented program. Those skilled in the art will appreciate that there are many combinations of electronic systems and instruction sets that may be effectively used in the present invention.

The SICS is also provided with access to the customer account information storage means (CAISM) of the bank 105, so that the SICS can obtain specific account information for specific customers and store this information in its information storage means. A communications medium 106 is provided to carry communications between the CAISM and the SICS. This medium may be the Internet. In this case, to ensure the confidentiality of the data transmission between the CAISM and the SICS, a communications encryption protocol such as a secure socket layer may be employed. The data transmission protocol employed in communications between the CAISM and SICS may be, but is not limited to, the extensible markup language (XML) protocol or the open financial exchange (OFX) protocol.

Password providing means 107 in the form of a computer instruction set instructs the processor of the SICS to provide customer-selected passwords to bank customers in response to requests made by the customers by who provide their names, bank account identifications, and electronic mail addresses for receiving statements. This registration process is performed using web pages served via a communications medium 109 such as the Internet by a web server 108 of the SICS to a web-enabled client device 110 used by the customer to receive the web pages and to send back the requested information. The client device 110 comprises a computer processor, an input, an output, information storage means and a web browser computer program supported by the computer processor. It should be apparent to one skilled in the art that password provision according to the invention can be implemented in many ways including, but not limited to, providing passwords in-person to bank customers visiting a bank branch, providing passwords to customers from automated teller machines (ATMs), providing passwords to customers by regular mail, and combinations thereof.

In this example, the password providing means apply a password hashing algorithm, such as MD5 or SHA-1, to the password to generate a password hash value. For security purposes, the SICS stores the password hash value but not the customer's password. Further, the password hash value, the customer's preferred electronic mail address, and sufficient customer bank account identification as necessary to obtain customer account information from the bank's CAISM, are stored in an associated manner within the information storage means. It should be apparent to one skilled in the art that many kinds of computer accessible memory methods and systems can be employed as the information storage means for such purpose. The information storage means may be in the form of a spreadsheet, database, data table, or in any other suitable form. For example, the information storage means of the SICS and the CAISM may be relational databases managed by a standard relational database management system employing the Structured Query Language ("SQL"), a fourth generation computer language. Combinations are also possible. In an alternative embodiment of the invention, there may be one information storage means providing the functions of both the bank's CAISM and the information storage means of the SICS as presented in this example.

In this example bank statements are sent to customers on a periodic basis selected by the system administrator of the bank and programmed into the scanning means, which is a set of computer instructions supported by the computer processor of the SICS. A scanning means 111 is provided which utilizes or comprises a clock and calendar function so that when the end of a period is reached, it queries the bank CAISM for the account information of at registered customers (those provided with passwords and having provided email addresses) so that this information is obtained and stored in the information storage means of the SICS. It should be apparent to one skilled in the art that the SICS could be made programmable so that the periods for issuance are selectable by bank personnel and/or customers and that issuance of statements sent according to the invention could be made on special request of the customer and/or in response to the occurrence of various specified transactions or events. It should be further understood that, for this and other embodiments of the invention, at least some of the information content included in a message sent according to the invention can be selectable by the intended recipient or by another authorized party.

The message preparation means 112, a set of computer instructions supported by the processor of the SICS then prepares the statement as an encrypted electronic mail message as follows. First, the customer's account information is used to generate a statement message in HTML format. Second, a message hash value is generated by applying a one-way hashing algorithm, such as MD5 or SHA-1, to the message. Third, both the message and the message hash value are encrypted using a symmetric encryption algorithm such as IDEA or RC4 with the password hash value used as the secret key. The message hash value can be appended to the HTML-formatted message before encryption. Fourth, the message preparation means embeds a decryption program which is in the form of a script or applet into the HTML which comprises the encrypted message and encrypted message hash value. In this example, the three HTML message components are bundled according to the MIME standard. Since the decryption program is in the form of an applet or script, it can be executed by a web browser such as Netscape Navigator 4.0™ or Microsoft Internet Explorer 4.0™ supported by a computer processor of a device used by a recipient to access his or her email. The decryption program contains instructions for applying the password hashing algorithm, the message hashing algorithm, and the symmetric encryption algorithm. The password hashing algorithm and the message hashing algorithm may be the same or different. The decryption program of the example is further described below with reference to its functions which are executed by the customer's client system.

The HTML MIME message comprising the encrypted message, the encrypted message hash value and script/applet, is then ready to be sent to the recipient as an electronic mail message. Accordingly, a message sending means 113 comprising an SMTP server is provided to send the message, via a communications medium such as the Internet 114, to the customer's electronic mail account by using the electronic mail address previously provided by the customer and retrieved from the information storage means. The message is stored by the electronic mail account system 115 hosting the customer's account so that it can be retrieved by the customer. Web-based electronic mail account services are broadly available from providers such as Netscape™, Hotmail™, Yaho™ and America Online™.

In a standard manner, the customer is able to access his or her electronic mail account via an Internet connection using a web browser program, such as Netscape Navigator 4.0™ or Internet Explorer 4.0™ or superior versions thereof, supported by a computer processor of a suitable device 116 having input means such as a keyboard, output means such as a display, and information storage means such as standard computer readable memory. Other types of applet/script-enabled programs with which the customer can access electronic mail include electronic mail readers such as Outlook 2000™, Outlook Express™, Netscape Messenger™ and Eudora™, and web readers such as UOL™, BOL™, Hotmail™, and IG™. Examples of the supporting devices which can be used are IBM™-compatible, Macintosh™ or Unix™-based personal computers, personal information managers such as the Palm™ hand-held computer device, network computers, and suitably enabled telephones and cellular telephones. In this example, the device used by the customer for password provision and that used for receiving the message may be the same device or different devices.

In this example, the POP3 protocol is used to enable the actual delivery of the electronic mail message from the electronic mail account to the device used by the customer to access the account, but any suitable means or protocol can be used. Although the example illustrates an embodiment in which the electronic mail message is received by the customer's device via a temporary Internet connection to an electronic mail account system, it should be understood by those knowledgeable in the art that the message could also be communicated to the customer's device via other communications networks or media, and/or via permanent or semi-permanent network connections.

The MIME message 117 is shown stored in the information storage means of the device 116 after downloading from the electronic mail account system. The small clipped rectangles represent the path of the MIME message from the message preparation means and electronic mail server of the SICS to the electronic mail account system.

After receiving the MIME in the form of electronic mail, the script/applet decryption program is executed by the web browser (or electronic mail reader or web reader) so that the following functions are performed. First, the decryption program requests and receives password input from the recipient. Second, the program applies the password hashing algorithm to the input password to generate a password input hash value. Third, the password input hash value is used as the secret key in applying the symmetric decryption algorithm to the encrypted message (the encrypted bank statement) and the encrypted message hash value. This generates a putative message decryption and a putative decryption of the message hash value. Fourth, the program applies the message hashing algorithm to the putative message decryption to generate a second message hash value. Fifth, the program compares the putatively decrypted message hash value with the second message hash value. If the two message hash values are identical, the password is correct and there is a high probability that the integrity of the message has been maintained during its transit. In this case, the decryption program directs the web browser to display the decrypted message. If the two message hash values are different, either the password is incorrect, or the message has been altered during its transit, or possibly both. In this case, the decryption program directs the browser to indicate that there is a problem with the message. When the password is incorrect, the putative decryption would appear as gibberish if it were displayed.

It should be understood by one knowledgeable in the art that the statement issuing system components described above and for any system according to the invention, can be in separate interacting machines, virtual components of the same machine, or any combination thereof. It should further be understood that the SICS may be implemented so that the function of at least some of its components is carried out by components of a bank's data processing systems. It should still further be understood that the function of any component of the SICS can be distributed among different machines.

Although the example illustrates the invention with respect to a system for the issuance of periodic bank account statements, it should be understood that the invention can be implemented for the secure communications of any sort of information between any sort of parties. This includes any sort of periodically updated information whether or not such information is associated with an account of some kind. In one embodiment of the invention, the secure communication is made in response to a transaction occurring in an account. For example, for a brokerage account in which orders to buy or sell securities have been placed, a secure communication according to the invention can be used to notify the account holder or other authorized party of the occurrence of the transaction. For any embodiment of the invention in which account information is communicated, it should be understood that the intended recipient is not necessarily the account holder but can be any individual or entity authorized to receive the information. Further, the account holder may be an entity, such as a business organization,rather than a person. In another embodiment, the invention is used to communicate medical information. This may include medical test results of the intended recipient. In still another embodiment the invention communicates billing information. In a related embodiment the invention communicates payment information. In a further embodiment, a single sender system sends account-based and non-account based information updates to a recipient. In a related embodiment, at least some of the types of information sent to a recipient are selected in advance by the recipient. For example, a brokerage account holder may wish to have stock quotations sent via messages encrypted according to the invention. In a further embodiment, marketing messages are sent to individuals registered to receive other types of information such as account information. In still another embodiment, the invention allows an individual user to send encrypted messages such as encrypted email messages to any user-specified recipient.

In still other embodiments, an individual person is the sender of encrypted messages according to the invention. In this case, the recipient may also be another person. Alternatively, for example, the recipient may be a commercial entity or an automated computer system thereof which decrypts the sent message using the symmetric algorithm and the secret key. In this fashion, for example, encrypted instructions, such as for placing a trading order, can be sent from an individual to their financial institution. Moreover, an automated computer system of the institution can decrypt the message and implement the instructions contained therein. In this sort of application, the sender may be provided with a template or special program for the facile and proper formatting of such messages.

In further embodiments, systems according to the invention are implemented as a for-fee commercial service to clients. The client may be a banking institution as in the above example or any sort of party, entity or organization. In one embodiment, a one-time fee can be charged to the client for the client's implementation of the invention. In another embodiment, the client is charged a fee for a term of service in implementing the invention. In a further embodiment, systems for sending and/or receiving messages according to the invention are provided with an accounting means, in the form of a set of computer instructions, to track and store the number of messages sent according to the invention (in general or within a set period of time) and the types of information sent in those communications. This tracking information is recorded in one or more accounts. The information comprising the account can be stored in computer readable memory. The accounting means may also track messages which are sent according to the invention (e.g. from customers) for receipt by the system, if the system is so configured. In any case, the accounting information gathered can be used by the provider of the systems to determine the fee charged to a client on a usage basis.

The invention also provides for the use of digital signatures to ensure both the integrity and authenticity of messages decrypted by recipients using the symmetric key algorithm methods of the invention.

In a first digital signature embodiment of the invention, a hash value of the unencrypted message is generated and encrypted using a public key algorithm with the private key of the sender to generate a digital signature. The digital signature is sent to the recipient, included with, or separately from, the symmetrically encrypted message. In this case, either the decryption program, an Internet program which the recipient uses to access the email, or another program enables decryption of the digital signature using the public key. As previously described, the decryption program receives password input from the recipient and uses this input, or a hash value generated therefrom, as the secret key to decrypt the encrypted message using a symmetric algorithm. The decryption program then generates a hash value from the putatively decrypted message and compares it with the hash value decrypted from the digital signature. If the two hash values are identical, there can be assurance that the password is correct, that the decrypted message has not been altered in transit, and that the message is from the claimed sender (not from an impostor). This embodiment of the invention is similar to those wherein the message hash value is encrypted with a symmetric algorithm but here a higher security public key algorithm is used.

In order to employ the digital signature aspects of the invention, a device used by the recipient to access the encrypted message must be able to access a necessary key, from stored memory or input, and must have enough computational power to readily process the public key algorithm. As defined herein, such a device is said to be public key enabled. A public key enabled device may be, but is not necessarily, a device supporting the public key infrastructure, as known in the art.

In a second digital signature embodiment, a message hash value is generated and then encrypted with the symmetric algorithm to generate a symmetrically encrypted message hash value. The same message hash value is also independently encrypted with the public key algorithm to generate a digital signature. Note that a different hashing algorithm could be used to generate two different message hash values for the same message, so long as the recipient's device can be instructed by the decryption program to perform both hashing algorithms. If the recipient uses a device supporting the public key infrastructure (including access to the recipient public key or an appropriate input device for receiving said key), the digital signature can be decrypted to yield the decrypted message hash value. If this hash value is identical to a hash value generated from the symmetrically decrypted message, there is assurance of both the integrity and authenticity of the sent message. Whether or not the device used by the recipient supports the public key infrastructure, the decryption program can generate a hash value of the putative message decryption and compare this to the putative decryption of the symmetrically encrypted message hash value. If these hash values are identical, there is reasonable assurance of the integrity of the message but only assurance of its authenticity to the extent that is inherent in the encryption and hashing process.

In a third digital signature embodiment of the invention, a hash value is generated from a "unit" of data comprising both the symmetrically encrypted message and symmetrically encrypted message hash value. In this case the encrypted message and encrypted message hash value may each be part of the same MIME message. A single hash value is then generated from the unit of data which comprises the two parts. A digital signature is then generated by encrypting this hash value using a public key algorithm and a private key. The digital signature is also sent to the intended recipient. To do so, the digital signature may be made part of the same communication or MIME message.

Upon receipt of the MIME message, the decryption program generates a hash value from the combined encrypted message and encrypted message hash value parts of the MIME message. The decryption program or another program such as the Internet application decrypts the digital signature using the public key algorithm to yield the hash value for the combined encrypted message and encrypted message hash value. If these two hash values are the identical, there is assurance that the encrypted message plus encrypted message hash value were not altered in transit and that the message is from the claimed source. From this it can be inferred that the message itself has not been altered in transit.

The decryption program then decrypts the encrypted message and the encrypted message hash value using the password input of the recipient with a symmetric algorithm, as described before. The decryption program generates a hash value from the putatively decrypted message. If this hash value and the decrypted message hash value are identical, there is assurance that the password is correct and the decryption of the encrypted message is correct. Hence, when the recipient device is public key enabled, this embodiment provides an authenticity check using a public key algorithm and two integrity checks, one with a public key algorithm and one with a symmetric key algorithm.

It should be understood, that in embodiments of the invention in which digital signatures are decrypted, that this decryption may be performed in whole by a program sent to the recipient with or separately from the encrypted message, that it may be performed in part by such a program, that it may be performed by another program (such as a web browser) under direction of a program sent to the recipient and/or that it may be performed wholly by a previously installed public-key enabled program supported on the device on which the recipient accesses and reads his or her messages. Many variations on the use of digital signatures and other authentication techniques which are within the scope of the invention should be apparent to those skilled in the art.

The embodiments described herein are intended to be merely exemplary and not limiting. Numerous variations, modifications and implementations of the present invention will be readily apparent to those skilled in the art. Accordingly, the scope of the invention is to be limited only by the appended claims and their equivalents.

What is claimed is:

1. A method for transmitting and receiving encrypted messages, the method comprising the steps of:

(1) providing a password to the intended recipient of a message, wherein the password is mutually agreed upon in advance by a sender and the recipient;

(2) preparing a message to be sent to the recipient;
(3) encrypting the message with a symmetric encryption algorithm wherein a secret key for the symmetric encryption algorithm is the password;
(4) sending the recipient the encrypted message, wherein the encrypted message does not include the password; and
(5) sending the recipient a set of computer instructions instructing at least one computer processor of a device the recipient uses to access the encrypted message to perform the steps of:
  (a) accepting password input from the recipient; and
  (b) decrypting the encrypted message with the symmetric encryption algorithm using the password inputted in step (a) as the symmetric key.

2. A method for transmitting and receiving encrypted messages, the method comprising the steps of:
(1) providing a password to the intended recipient of the message;
(2) preparing a message to be sent to the recipient;
(3) applying a hashing algorithm to the message to generate a message hash value;
(4) encrypting the message and the message hash value with a symmetric encryption algorithm wherein a secret key for the symmetric encryption algorithm is the password;
(5) sending the recipient the encrypted message and encrypted message hash value; and
(6) sending the recipient a set of computer instructions instructing at least one computer processor of a device the recipient uses to access the encrypted message to perform the steps of:
  (a) accepting password input from the recipient;
  (b) decrypting the encrypted message and encrypted message hash value with the symmetric encryption algorithm using the password inputted in step (a) as the symmetric key;
  (c) applying the hashing algorithm to the decrypted message obtained in step (b) to generate a message hash value; and
  (d) comparing the message hash value obtained in step (c) with the message hash value obtained in step (3) to verify the integrity of the message received by the recipient.

3. A method for transmitting and receiving encrypted messages, the method comprising the steps of:
(1) providing a password to the intended recipient of the message;
(2) applying a first hashing algorithm to the password to generate a password hash value;
(3) preparing a message to be sent to the recipient;
(4) encrypting the message with a symmetric encryption algorithm wherein a secret key for the symmetric encryption algorithm is the password hash value;
(5) sending the recipient the encrypted message; and
(6) sending the recipient a set of computer instructions instructing at least one computer processor of a device the recipient uses to access the encrypted message to perform the steps of:
  (a) accepting password input from the recipient;
  (b) applying the first hashing algorithm to the password input of (a) to generate the password hash value; and
  (c) decrypting the encrypted message with the symmetric encryption algorithm using the password hash value generated in step (b) as the symmetric key.

4. A method for transmitting and receiving encrypted messages, the method comprising the steps of:
(1) providing a password to the intended recipient of the message;
(2) applying a first hashing algorithm to the password to generate a password hash value;
(3) preparing a message to be sent;
(4) applying a second hashing algorithm to the message to generate a message hash value;
(5) encrypting the message and the message hash value with a symmetric encryption algorithm using the password hash value as a symmetric key;
(6) sending the recipient the encrypted message and the encrypted message hash value to the recipient; and
(7) sending the recipient a set of computer instructions instructing at least one computer processor of a device the recipient uses to access the encrypted message to perform the steps of:
  (a) accepting password input from the recipient;
  (b) applying the first hashing algorithm to the password input of (a) to generate the password hash value;
  (c) decrypting the encrypted message with the symmetric encryption algorithm using the password hash value generated in step (b) as the symmetric key;
  (d) decrypting the encrypted message hash value with the symmetric encryption algorithm using the password hash value generated in step (b) as a symmetric key;
  (e) applying the second hashing algorithm to the decrypted message to generate a hash value; and
  (f) comparing the message hash value obtained in step (d) with the message hash value obtained in step (e) to verify the integrity of the message received by the recipient.

5. The method according to claim 4 wherein the first hashing algorithm and the second hashing algorithm are the same.

6. The method according to any one of claims 1–5 wherein the step of sending the recipient the encrypted message and the step of sending the recipient a set of computer instructions comprise sending the recipient the encrypted message and the set of computer instructions as a single combined communication.

7. The method according to claim 6 wherein the encrypted message is an encrypted markup-language document.

8. The method according to any one of claims 1–5 wherein the step of sending the recipient the encrypted message and the step of sending the recipient a set of computer instructions comprise sending the recipient the encrypted message and the set of computer instructions as parts of a single MIME message.

9. The method according to claim 8 wherein the encrypted message is an encrypted markup-language document.

10. The method according to claim 9 wherein the set of computer instructions sent to the recipient are embedded in a mark-up language document.

11. The method according to claim 9 wherein the markup language is selected from the group consisting of hypertext markup language (HTML), extensible markup language (XML), wireless markup language (WML), and forms markup language (FML).

12. The method according to claim 11 wherein the set of computer instructions sent to the recipient are in a form selected from the group consisting of scripts and applets.

13. The method according to claim 12 wherein the medium for sending is an electronic communications network.

14. The method according to claim 13 wherein the electronic communications network is the Internet.

15. The method according to claim 14 wherein the message is an electronic mail message.

16. The method according to claim 13 wherein the electronic communications network is a wireless communications network.

17. The method according to any one of claims 1–5 wherein the intended recipient is an entity authorized to receive account information pertaining to a financial account, the method further comprising the step of:
periodically scanning the account information; and
wherein the step of preparing a message further comprises preparing a message in response to the scanning wherein the message comprises at least a subset of the scanned account information.

18. The method according to claim 17 wherein the message comprises a summary of account information.

19. The method according to claim 17 wherein the entity is selected from the group consisting of the holders of the financial account and authorized agents thereof.

20. The method according to any one of claims 1–5 wherein the intended recipient is an entity authorized to receive account information pertaining to a financial account, wherein the step of preparing a message is in response to the occurrence of a transaction in the account, and wherein the message comprises information related to the transaction.

21. The method according to claim 20 wherein the intended recipient is selected from the group consisting of the holders of the financial account and authorized agents thereof.

22. The method according to any one of claims 1–5 wherein the intended recipient is an entity authorized to receive medical information pertaining to at least one patient and wherein the message comprises the medical information.

23. The method according to claim 22 wherein the intended recipient is selected from the group consisting of the patient and medical personnel.

24. The method according to any one of claims 1–5 further comprising the steps of:
generating a digital signature comprising an encrypted message hash value of the prepared message wherein a hash value of the prepared message is encrypted using a private key of the sender with a public-key encryption algorithm;
sending the digital signature to the recipient; and
sending the recipient a second set of computer instructions instructing at least one computer processor of a device the recipient uses to access the encrypted message to perform the steps of:
(a) decrypting the digital signature using a public key of the sender with the public-key encryption algorithm to generate the message hash value
(b) generating a message hash value of the symmetrically decrypted message using the same hashing algorithm used to generate the message hash value for the digital signature
(c) comparing the message hash value generated in (a) with the message hash value generated in (b) to verify the integrity of the message received by the recipient.

25. The method according to any one of claims 1–5 wherein at least part of the information content of a message is selectable by the intended recipient.

26. The method according to any one of claims 2, 4 and 5 further comprising the steps of:
combining the prepared message and message hash value into a unit, wherein the step of encrypting the message and the message hash value encrypts the unit;
generating a digital signature comprising an encrypted hash value of the symmetrically encrypted unit encrypted wherein the hash value is encrypted using a private key of the sender with a public-key encryption algorithm;
sending the digital signature to the recipient; and
sending the recipient a set of computer instructions instructing at least one computer processor of a device the recipient uses to access the encrypted message to perform the steps of:
(a) decrypting the digital signature using a public key of the sender with the public-key encryption algorithm to generate the hash value for the symmetrically encrypted unit;
(b) generating a hash value of the symmetrically encrypted unit using the same hashing algorithm used to generate the digital signature; and
(c) comparing the hash value generated in (a) with the value generated in (b) to verify the integrity of the message received by the recipient.

27. The method according to claim 26 wherein the unit comprises a MIME message.

28. The method according to claim 26 wherein the encrypted unit is part of a MIME message.

29. A system for transmitting and receiving encrypted messages, the system comprising:
(1) preparing means for preparing a message to be sent to the recipient;
(2) encrypting means for encrypting the message with a symmetric encryption algorithm wherein a secret key for the symmetric encryption algorithm is a password mutually agreed upon in advance by a sender and the intended recipient;
(3) sending means for sending the recipient:
(a) the encrypted message, wherein the encrypted message does not include the password, and
(b) a set of computer instructions for instructing at least one computer processor of a device the recipient uses to access the encrypted message to perform the steps of:
(i) accepting password input from the recipient;
(ii) decrypting the encrypted message with the symmetric encryption algorithm using the password inputted in step (i) as the symmetric key.

30. The system according to claim 29 further comprising:
providing means for providing the password to the intended recipient of a message.

31. A system for transmitting and receiving encrypted messages, the system comprising:
(1) preparing means for preparing a message to be sent to the recipient;
(2) hashing means for applying a hashing algorithm to the message to generate a message hash value;
(3) encrypting means for encrypting the message and the message hash value with a symmetric encryption algorithm wherein a secret key for the symmetric encryption algorithm is a password known to the intended recipient;
(4) sending means for sending the recipient:
(a) the encrypted message and encrypted message hash value, and (b) a set of computer instructions for instructing at least one computer processor of a device the recipient uses to access the encrypted message to perform the steps of:
  (i) accepting password input from the recipient;
  (ii) decrypting the encrypted message and encrypted message hash value with the symmetric encryption algorithm using the password inputted in step (i) as the symmetric key;
  (iii) applying the hashing algorithm to the decrypted message obtained in step (ii) to generate a message hash value;
  (iv) comparing the message hash value obtained in step (iii) with the message hash value obtained in step (ii) to verify the integrity of the message received by the recipient.

32. The system according to claim 31 further comprising:
providing means for providing the password to the intended recipient of the message.

33. A system for transmitting and receiving encrypted messages, the system comprising:
(1) preparing means for preparing a message to be sent to the recipient;
(2) encrypting means for encrypting the message with a symmetric encryption algorithm wherein a secret key for the symmetric encryption algorithm is a password hash value generated from a password known to the intended recipient;
(3) sending means for sending the recipient:
  (a) the encrypted message, and
  (b) a set of computer instructions for instructing at least one computer processor of a device the recipient uses to access the encrypted message to perform the steps of:
    (i) accepting password input from the recipient;
    (ii) applying the password hashing algorithm to the password input of (i) to generate the password hash value; and
    (iii) decrypting the encrypted message with the symmetric encryption algorithm using the password hash value generated in step (ii) as the symmetric key.

34. The system according to claim 33 further comprising
providing means for providing the password to the intended recipient of the message; and
a password hashing means for applying a password hashing algorithm to the password to generate a password hash value.

35. A system for transmitting and receiving encrypted messages, the system comprising:
(1) preparing means for preparing a message to be sent;
(2) message hashing means for applying a hashing algorithm to the message to generate a message hash value;
(3) encrypting the message and the message hash value with a symmetric encryption algorithm using a hash value generated from a password known to the intended recipient as a symmetric key; and
(4) sending the recipient:
  (a) the encrypted message and the encrypted message hash value, and
  (b) a set of computer instructions instructing at least one computer processor of a device the recipient uses to access the encrypted message to perform the steps of:
    (i) accepting password input from the recipient;
    (ii) applying the password hashing algorithm to the password input of (i) to generate the password hash value;
    (iii) decrypting the encrypted message with the symmetric encryption algorithm using the password hash value generated in step (ii) as the symmetric key;
    (iv) decrypting the encrypted message hash value with the symmetric encryption algorithm using the password hash value generated in step (ii) as a symmetric key;
    (v) applying the message hashing algorithm to the decrypted message to generate a hash value; and
    (vi) comparing the message hash value obtained in step (iv) with the message hash value obtained in step (v) to verify the integrity of the message received by the recipient.

36. The system according to claim 35 further comprising:
providing means for providing the password to the intended recipient of the message; and
password hashing means for applying a password hashing algorithm to the password to generate a password hash value.

37. The system according to any one of claims 31 and 34–36 further comprising:
combining means for combining the prepared message and message hash value into a unit,
wherein the encryption means encrypts the message and the message hash value by encrypting the unit using the symmetric algorithm to obtain an encrypted unit, and
wherein the sending means sends the encrypted combined message and message hash value by sending the encrypted unit;
digital signature generating means for generating a digital signature comprising a hash value of the symmetrically encrypted unit encrypted using a private key of the sender with a public-key encryption algorithm; and
sending means for sending the recipient:
  (a) the digital signature, and
  (b) a set of computer instructions for instructing at least one computer processor of a device the recipient uses to access the encrypted message to perform the steps of:
    (i) decrypting the digital signature using a public key of the sender with the public-key encryption algorithm to generate the hash value for the symmetrically encrypted unit;
    (ii) generating a hash value of the symmetrically encrypted unit using the same hashing algorithm used to generate the digital signature; and
    (iii) comparing the hash value generated in (i) with the value generated in (ii) to verify the integrity of the message received by the recipient.

38. The system according to claim 37 wherein the unit comprises a MIME message.

39. The method according to claim 37 wherein the encrypted unit is part of a MIME message.

40. A method of decrypting a message comprising the step of:
on a device comprising input means, at least one computer processor and computer readable memory, wherein an encrypted message and a set of computer instructions according to any one of claims 29, 31, 33 and 35 is stored, executing the set of computer instructions and inputting a password to decrypt the message.

41. The system according to any one of claims 29, 31, 33 and 35 further comprising:

accounting means for accounting for the sent message in an account tracking sent messages.

42. The system according to any one of claims 29, 31, 33 and 35, wherein the message is an electronic mail message.

43. The system according to claim 42, wherein the set of computer instructions sent to the recipient by the sending means are in a form selected from the group consisting of scripts and applets.

44. The system according to any one of claims 29, 31, 33 and 35, wherein the set of computer instructions sent to the recipient by the sending means are in a form selected from the group consisting of scripts and applets.

45. A computer readable memory instructing at least one computer to perform the steps of:

(1) preparing a message to be sent to an intended recipient;

(2) encrypting the message with a symmetric encryption algorithm wherein a secret key for the symmetric encryption algorithm is a password known to the intended recipient, wherein the password is mutually agreed upon in advance by a sender and the recipient;

(3) sending the recipient:

(a) the encrypted messages wherein the encrypted message does not include the password, and (b) a set of computer instructions for instructing at least one computer processor of a device the recipient uses to access the encrypted message to perform the steps of:

(i) accepting password input from the recipient; and (ii) decrypting the encrypted message with the symmetric encryption algorithm using the password inputted in step (i) as the symmetric key.

46. The memory according to claim 45 further instructing at least one computer to perform the step of:

providing the password to the intended recipient of a message.

47. A computer readable memory instructing at least one computer to perform the steps of:

(1) preparing a message to be sent to an intended recipient;

(2) applying a hashing algorithm to the message to generate a message hash value;

(3) encrypting the message and the message hash value with a symmetric encryption algorithm wherein a secret key for the symmetric encryption algorithm is a password known to the intended recipient;

(4) sending the recipient:

(a) the encrypted message and the encrypted message hash value, and (b) a set of computer instructions for instructing at least one computer processor of a device the recipient uses to access the encrypted message to perform the steps of:

(i) accepting password input from the recipient;

(ii) decrypting the encrypted message and encrypted message hash value with the symmetric encryption algorithm using the password inputted in step (i) as the symmetric key;

(iii) applying the hashing algorithm to the decrypted message obtained in step (ii) to generate a message hash value; and (iv) comparing the message hash value obtained in step (iii) with the message hash value obtained in step (2) to verify the integrity of the message received by the recipient.

48. The computer readable memory according to claim 47 further instructing at least one computer to perform the steps of:

providing the password to the intended recipient of the message.

49. A computer readable memory instructing at least one computer to perform the steps of:

(1) preparing a message to be sent to an intended recipient;

(2) encrypting the message with a symmetric encryption algorithm wherein a secret key for the symmetric encryption algorithm is a password hash value generated from a password known to the intended recipient;

(3) sending the recipient:

(a) the encrypted message (b) a set of computer instructions for instructing at least one computer processor of a device the recipient uses to access the encrypted message to perform the steps of:

(i) accepting password input from the recipient;

(ii) applying the password hashing algorithm to the password input of (i) to generate the password hash value;

(iii) decrypting the encrypted message with the symmetric encryption algorithm using the password hash value generated in step (ii) as the symmetric key.

50. The computer readable memory according to claim 49 further instructing at least one computer to perform the steps of:

providing the password to the intended recipient of the message; and applying a password hashing algorithm to the password to generate a password hash value.

51. A computer readable memory instructing at least one computer to perform the steps of:

(1) preparing a message to be sent to an intended recipient;

(2) applying a hashing algorithm to the message to generate a message hash value;

(3) encrypting the message and the message hash value with a symmetric encryption algorithm using a hash value generated from a password known to the intended recipient as a symmetric key; and (4) sending the recipient:

(a) the encrypted message and the encrypted message hash value, and (b) a set of computer instructions instructing at least one computer processor of a device the recipient uses to access the encrypted message to perform the steps of:

(i) accepting password input from the recipient;

(ii) applying the password hashing algorithm to the password input of (i) to generate the password hash value;

(iii) decrypting the encrypted message with the symmetric encryption algorithm using the password hash value generated in step (ii) as the symmetric key;

(iv) decrypting the encrypted message hash value with the symmetric encryption algorithm using the password hash value generated in step (ii) as a symmetric key;

(v) applying the message hashing algorithm to the decrypted message to generate a hash value; and (vi) comparing the message hash value obtained in step (iv) with the message hash value obtained in step (v) to verify the integrity of the message received by the recipient.

52. The computer readable memory according to claim 51 instructing at least one computer to perform the steps of:

providing a password to the intended recipient of the message; and applying a password hashing algorithm to the password to generate a password hash value.

53. A computer readable memory comprising the set of computer instructions sent to the recipient in any one of claims 45, 47, 49 and 51.

54. The computer readable memory according to any one of claims 47, 48, 51 and 52 further instructing at least one computer to perform the steps of:

combining the prepared message and message hash value into a unit, wherein the step of encrypting encrypts the message and the message hash value by encrypting the unit using the symmetric algorithm, and wherein the step of sending sends the encrypted message and the encrypted message hash value by sending the unit;

generating a digital signature comprising a hash value of the symmetrically encrypted unit encrypted using a private key of the sender with a public-key encryption algorithm; and sending the recipient:

(a) the digital signature, and (b) a set of computer instructions for instructing at least one computer processor of a device the recipient uses to access the encrypted message to perform the steps of:

(i) decrypting the digital signature using the public key of the sender with the public-key encryption algorithm to generate the hash value for the symmetrically encrypted unit;

(ii) generating a hash value of the symmetrically encrypted unit using the same hashing algorithm used to generate the digital signature; and (iii) comparing the hash value generated in (i) with the hash value generated in (ii) to verify the integrity of the encrypted unit received by the recipient.

55. A computer readable memory comprising the set of computer instructions sent to the recipient in claim 54.

56. The computer readable memory according to any one of claims 45, 47, 49 and 51 further instructing at least one computer to perform the step of:

accounting for the sent message in an account tracking sent messages.

57. The computer readable memory according to any one of claims 45, 47, 49 and 51 wherein the message is an electronic mail message.

58. The computer readable memory according to claim 57, wherein the set of computer instructions sent to the recipient are in a form selected from the group consisting of scripts and applets.

59. The computer readable memory according to any one of claims 45, 47, 49 and 51, wherein the set of computer instructions sent to the recipient are in a form selected from the group consisting of scripts and applets.

* * * * *